United States Patent
Lee et al.

(10) Patent No.: US 7,558,030 B2
(45) Date of Patent: Jul. 7, 2009

(54) RESISTIVE SUPERCONDUCTING FAULT CURRENT LIMITER

(75) Inventors: Bang-Wook Lee, Cheongju (KR); Kwon-Bae Park, Daejeon (KR)

(73) Assignee: LS Industrial System Co., Ltd., Seoul (KR)

( * ) Notice: Subject to any disclaimer, the term of this patent is extended or adjusted under 35 U.S.C. 154(b) by 361 days.

(21) Appl. No.: 11/427,816

(22) Filed: Jun. 30, 2006

(65) Prior Publication Data
US 2007/0127171 A1    Jun. 7, 2007

(30) Foreign Application Priority Data
Dec. 2, 2005    (KR) .................. 10-2005-0117237

(51) Int. Cl.
*H02H 9/00* (2006.01)
(52) U.S. Cl. ............................. 361/19; 505/850
(58) Field of Classification Search ............ 361/19; 505/850
See application file for complete search history.

(56) References Cited

U.S. PATENT DOCUMENTS

| | | | |
|---|---|---|---|
| 3,629,690 A * | 12/1971 | Massar ...................... 361/19 |
| 5,379,020 A * | 1/1995 | Meier et al. ................. 505/211 |
| 5,414,586 A * | 5/1995 | Hara et al. .................. 361/19 |
| 5,600,522 A * | 2/1997 | Hull ........................... 361/19 |
| 6,337,785 B1 | 1/2002 | Okazaki |
| 6,958,893 B2 * | 10/2005 | Yuan .......................... 361/19 |
| 2005/0028347 A1 * | 2/2005 | Maher ....................... 29/592.1 |
| 2005/0068701 A1 | 3/2005 | Lee et al. |
| 2005/0153843 A1 * | 7/2005 | Kubota ....................... 505/100 |

FOREIGN PATENT DOCUMENTS

JP    1-190219 A    7/1989

OTHER PUBLICATIONS

English language Abstract of JP 1-190219 A.

* cited by examiner

*Primary Examiner*—Stephen W Jackson
*Assistant Examiner*—Scott Bauer
(74) *Attorney, Agent, or Firm*—Greenblum & Bernstein, P.L.C.

(57) ABSTRACT

A resistive superconducting fault current limiter comprises: a superconducting limiter element which is in a superconductive state in the event of a normal current occurrence, and which is in a normal conductive state having a predetermined resistance when a fault current larger than a predetermined threshold current value flows; a superconducting serial coil serially connected to the superconducting limiter element so as to face each other so that a current loss can be minimized accordingly as currents flow in opposite directions thus to cancel magnetic fields, and having a threshold current value greater than the threshold current value of the superconducting limiter element by a predetermined ratio; and a normal conductor parallel coil connected to the superconducting limiter element in parallel and having a predetermined resistance smaller than the resistance of the superconducting limiter element when a fault current occurs, for preventing the superconducting limiter element from being overheated by dividing a current flowing through the superconducting limiter element and for uniformly quenching the superconducting limiter element by generating a magnetic field when a fault current occurs

29 Claims, 5 Drawing Sheets

RESISTIVE SUPERCONDUCTING FAULT CURRENT LIMITER

BACKGROUND OF THE INVENTION

1. Field of the Invention

The present invention relates to a resistive superconducting fault current limiter, and more particularly, to a resistive superconducting fault current limiter capable of reducing a current loss of a superconducting limiter element due to a self magnetic field and an external magnetic field when a normal current is applied thereto, and capable of uniformly quenching the superconducting limiter element when a fault current such as a short circuit is applied thereto.

2. Description of the Background Art

A fault current limiter in an electric power system serves to limit mechanical, thermal, and electrical stresses applied to a bus bar, an insulator, a breaker, etc. of the electric power system when a fault current such as a short circuit, a ground fault, and a lightning strike occurs.

A superconducting fault current limiter utilizes a principle that a superconductor is quenched by a fault current exceeding a threshold current, that is, a superconductor is transited to a resistive state after its superconducting characteristic is lost.

A fault current flows to the superconducting fault current limiter due to a power system fault, the superconducting fault current limiter transits to a resistor having a high impedance thereby to prevent the fault current.

Generally, a superconductor having a specific resistance of '0'('zero') in a superconducting state is transited to a normal conducting state where the specific resistance is not '0'('zero') due to existence of a current or a magnetic field and a temperature characteristic. The phenomenon that the superconductor loses its superconducting characteristic is called as a 'quench'.

The superconducting fault current limiter is largely grouped as an inductive type and a resistive type. The resistive type superconducting fault current limiter has a simpler structure, a lighter weight, and a cheaper fabrication cost when compared with the inductive type one since a superconductor manages all operations including a fault current detection, a state transition to a resistor, and a current limiting.

Figure 1:
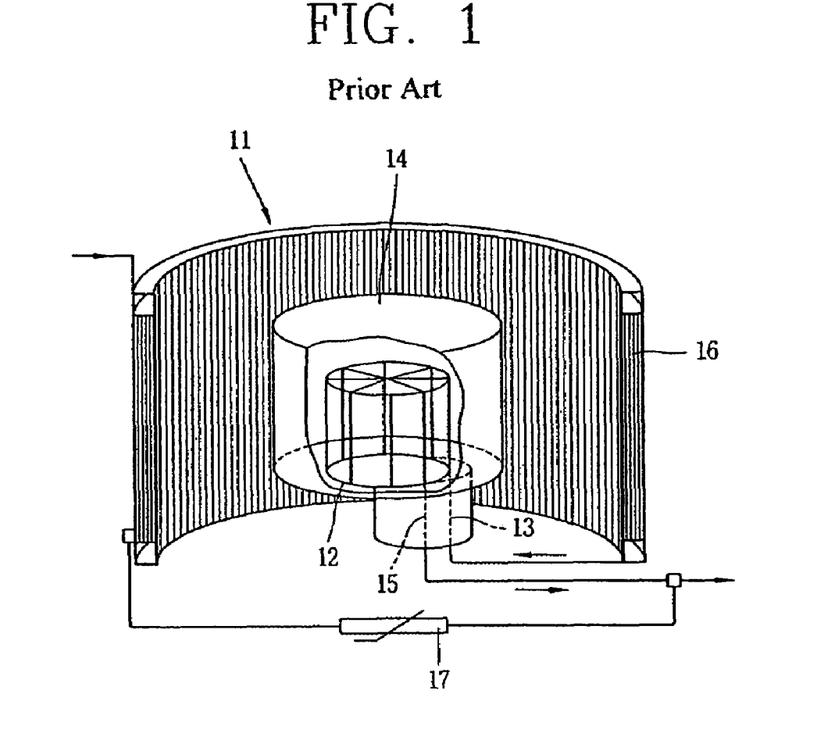
FIG. 1 is a construction view showing a resistive superconducting fault current limiter according to a embodiment of the conventional art.

A construction of the conventional resistive type superconducting fault current limiter will be explained with reference to FIG. 1.

The conventional resistive type superconducting fault current limiter comprises a cryostat 14 formed of a non-metallic material and filled with a refrigerant such as liquid nitrogen; a superconducting limiter element contained in the refrigerant inside the cryostat 14 and maintained as a superconductive state; a foil coil 16 installed outside the cryostat 14 so as to surround the cryostat 14, and formed of copper or aluminum, for applying a uniform magnetic field in a horizontal direction to the superconducting limiter element 12; current leads 13 and 15 for connecting the superconducting limiter element 12 and the foil coil 16 in series; and a varistor 17 connected to the series circuit between the superconducting limiter element 12 and the foil coil 16 in parallel, for preventing an over-voltage generated at the series circuit transiently.

The conventional resistive type superconducting fault current limiter is connected to a power line of an electric power system.

When a fault current flows to the resistive type superconducting fault current limiter, a uniform and strong magnetic field in a horizontal direction is applied to the superconducting limiter element 12 from the foil coil 16. Then, the superconducting limiter element 12 becomes a state exceeding a threshold current density and a threshold magnetic field density, and thus is transited to a normal conductive state having a resistance. Therefore, the fault current is limited.

In the resistive type superconducting fault current limiter, the foil coil 16 applies a strong magnetic field to the superconducting limiter element 12 in the event of a large fault current, thereby quenching the superconducting limiter element 12 uniformly and fast. However, even when a normal current less than a rated current flows the resistive type superconducting fault current limiter, the foil coil 16 applies a magnetic field to the superconducting limiter element 12 and the superconducting limiter element 12 generates a self magnetic field, which causes the superconducting limiter element 12 to have a great current loss. Therefore, in is order to increase an amount of a current flowing to the superconducting limiter element 12 by compensating the current loss, the number of the superconducting limiter elements 12 has to be increased, which causes a size and the number of the foil coil 16 to be increased. The problems become serious when a rated voltage of the electric power system is higher.

Since the current loss is represented as a heat emission, in order to maintain a temperature of 65K~77K(Kelvin) which is a temperature to maintain the superconducting limiter element in a superconductive state, a cooling device such as a larger cryostat is required.

Since a current always flows to the foil coil 16, a thermal shielding means of the cryostat 14 for a heat emission of the heated foil coil 16 is necessary.

In the conventional superconducting fault current limiter, a magnetic field generated from the foil coil 16 is applied to the superconducting limiter element 12 in a horizontal direction thereby to cause a uniform and simultaneous quenching of the superconducting limiter element. The above method is applied to a BISCCO-based superconducting limiter element thus to obtain the same effect. However, when the above method is applied to a YBCO-based superconducting limiter element, a magnetic field necessary to apply a horizontal magnetic field has to be larger than a magnetic field necessary to apply a vertical magnetic field by several tens times. In order for the foil coil 16 to generate a large magnetic field, the size and the number of the foil coils have to be increased. As the result, the superconducting fault current limiter has an increased size thus to have a difficulty in obtaining an installation space thereof, and a fabrication cost thereof is increased

BRIEF DESCRIPTION OF THE INVENTION

Therefore, an object of the present invention is to provide a resistive superconducting fault current limiter capable of reducing a current loss of a superconducting limiter element due to a self magnetic field and an external magnetic field in the event of a normal current occurrence, and capable of uniformly quenching the superconducting limiter element in the event of a fault current occurrence thereby enhancing a tolerance against a high voltage by the superconducting limiter element.

Another object of the present invention is to provide a resistive superconducting fault current limiter capable of reducing an entire size by enhancing a tolerance of a superconducting limiter element against a high voltage thereby minimizing the number of the superconducting limiter elements, and capable of reducing a fabrication cost.

To achieve these and other advantages and in accordance with the purpose of the present invention, as embodied and broadly described herein, there is provided a resistive superconducting fault current limiter, comprising: a superconducting limiter element which is in a superconductive state in the event of a normal current flow, and which is in a normal conductive state having a predetermined resistance when a fault current more than a predetermined threshold current value flows; a superconducting serial coil serially connected to the superconducting limiter element so as to face each other so that a current loss can be minimized accordingly as currents flow in opposite directions thus to cancel magnetic fields, and having a threshold current value greater than the threshold current value of the superconducting limiter element by a predetermined ratio; and a normal conductor parallel coil connected to the superconducting limiter element in parallel and having a predetermined resistance smaller than the resistance of the superconducting limiter element when a fault current occurs, for preventing the superconducting limiter element from being overheated by dividing a current flowing to the superconducting limiter element and for uniformly quenching the superconducting limiter element by generating a magnetic field when a fault current occurs.

According to another embodiment of the present invention, there is provided a resistive superconducting fault current limiter, comprising: a superconducting limiter element which is in a superconductive state in the event of a normal current flow, and which is in a normal conductive state having a predetermined resistance when a fault current larger than a predetermined threshold current value flows; a superconducting serial coil serially connected to the superconducting limiter element so as to face each other so that a current loss can be minimized accordingly as currents flow in opposite directions thus to cancel magnetic fields, and having an 'n' value larger than an 'n' value of the superconducting limiter element by a predetermined ratio so as to be previously quenched than the superconducting limiter element when a fault current occurs; a first normal conductor parallel coil connected to the superconducting limiter element in parallel and having a predetermined resistance smaller than the resistance of the superconducting limiter element when a fault current occurs, for preventing the superconducting limiter element from being overheated by dividing a current flowing to the superconducting limiter element and for uniformly quenching the superconducting limiter element by generating a magnetic field when a fault current occurs; and a second normal conductor parallel coil connected to the superconducting serial coil in parallel and having a predetermined resistance smaller than a resistance of the superconducting serial coil when a fault current occurs, for preventing the superconducting serial coil from being overheated by dividing a current flowing to the superconducting serial coil and for uniformly quenching the superconducting limiter element by generating a magnetic field when a fault current occurs.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, a resistive superconducting fault current limiter according to the present invention will be explained with reference to the attached drawings.

Figure 2:
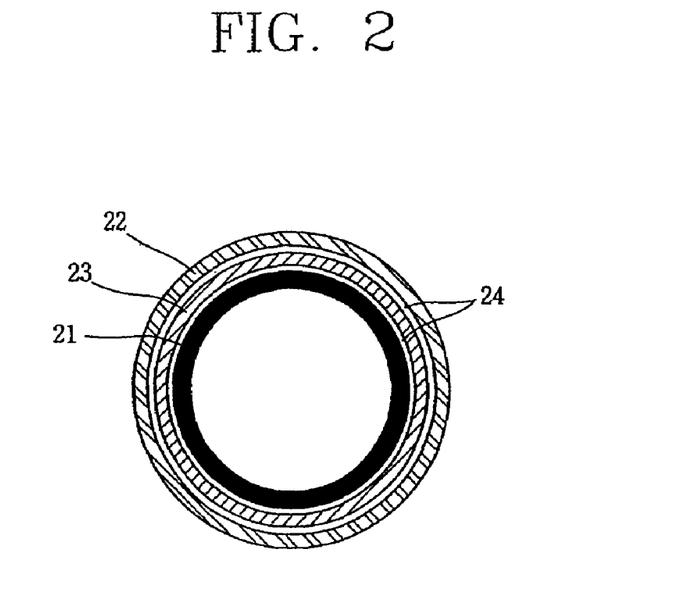
FIG. 2 is a sectional view showing a horizontally sectional structure of a resistive superconducting fault current limiter according to a first embodiment of the present invention.

FIG. 2 is a sectional view showing a horizontal structure of a resistive superconducting fault current limiter according to a first embodiment of the present invention.

As shown, the resistive superconducting fault current limiter according to a first embodiment of the present invention comprises: a superconducting limiter element 21 arranged at the innermost side thereof; a superconducting serial coil 22 arranged at the outermost side thereof so as to surround the superconducting limiter element 21; and a normal conductor parallel coil 23 arranged between the superconducting limiter element 21 and the superconducting serial coil 22.

The normal conductor parallel coil 23 is a solenoid shaped coil, and can be positioned between the superconducting limiter element 21 and the superconducting serial coil 22 as shown in FIG. 2. As another embodiment, the normal conductor parallel coil 23 can be also positioned outside the superconducting serial coil 22.

The resistive superconducting fault current limiter according to a first embodiment of the present invention can further comprise an insulating layer 24 disposed between the superconducting limiter element 21 and the normal conductor parallel coil 23 and between the normal conductor parallel coil 23 and the superconducting serial coil 22.

Herein, the insulating layer 24 has to be formed of material having the same thermal expansion rate as the rate of the superconducting limiter element 21, the normal conductor parallel coil 23, and the superconducting serial coil 22, or a material having a similar thermal expansion rate to them 21-23 for preventing a thermal stress and a surface separation at the time of being cooled or overheated. Since a strong electromagnetic force is generated outside the superconducting limiter element 21 at the time of a quenching operation and thus a large amount of heat is generated, a material for fast transmitting the heat to a refrigerant has to be used for the insulating layer 24. Therefore, the insulating layer 24 has to be formed of a material that can endure an electromagnetic force mechanically and has an excellent thermal conductivity and a thickness less than 1 mm.

Preferably, the insulating layer 24 is formed of an epoxy resin or a fiber glass reinforced plastic (so called abbreviated as FRP).

Figure 3:
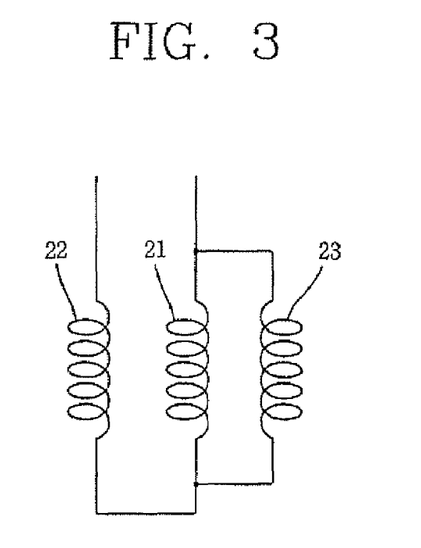
FIG. 3 is an equivalent circuit diagram of a resistive superconducting fault current limiter according to a first embodiment of the present invention.

FIG. 3 is an equivalent circuit diagram of a resistive superconducting fault current limiter according to a first embodiment of the present invention.

As shown, the resistive superconducting fault current limiter according to a first embodiment of the present invention comprises: a superconducting limiter element 21; a superconducting serial coil 22 serially connected to the superconducting limiter element 21 so as to face the superconducting limiter element 21; and a normal conductor parallel coil 23 connected to the superconducting limiter element 21 in parallel.

When a normal current flows through the superconducting limiter element 21, the element 21 is in a superconductive state having a resistance of '0' ('zero'). However, when a fault current larger than a threshold current value such as an electric shortage current having several times or tens of times of a rated current flows, the superconducting limiter element 21 becomes a quenched state to be transited into a normal conductive state having several tens of milliohms (mΩ) through several ohms (Ω).

The superconducting serial coil 22 is connected to the superconducting limiter element 21 in serial so as to face the superconducting limiter element 21, and the superconducting serial coil 22 and the superconducting limiter element 21 have opposite current directions to each other. Therefore, magnetic fields generated from the superconducting serial coil 22 and the superconducting limiter element 21 cancel each other, thereby minimizing a current loss due to the magnetic field. Herein, the current loss due to the magnetic field means the current loss due to a eddy current caused by the magnetic field.

The offsetting effect of the magnetic field can be more increased by constructing the superconducting serial coil 22 and the superconducting limiter element 21 as the same superconductor coil of a helical shape, and can be more increased by constructing the superconducting serial coil 22 and the superconducting limiter element 21 to have the same winding numbers and the same winding direction.

Preferably, a threshold current of the superconducting serial coil 22 is 1.1~2.0 times of a threshold current of the superconducting limiter element 21. Therefore, the superconducting limiter element 21 is firstly quenched than the superconducting coil 22 in the event of a fault current occurrence. When the superconductig element 21 is firstly quenched, a offsetting state of the magnetic fields generated from the superconducting serial coil 22 and the superconducting limiter element 21 is changed and thus the superconducting limiter element 21 is uniformly quenched by a strong magnetic field from the superconducting serial coil 22. As the result, the superconducting limiter element 21 has an enhanced tolerance against a high voltage.

The superconducting serial coil 22 and the superconducting limiter element 21 can be formed of one of a Bi2212 superconducting bulk, a Bi2223 superconducting wire, and a YBCO coated superconductor, respectively.

Since the superconducting limiter element 21 has several tens of milli ohms (mΩ) through several ohms (Ω) at the time of being quenched due to a fault current, a conductor having a resistance smaller than the several tens of milli ohms (mΩ) or several ohms (Ω) at an ordinary temperature is used as the normal conductor parallel coil 23. Preferably, the conductor used as the normal conductor parallel coil 23 is formed of one of copper, bronze, CuNi, and Ni alloy.

When the superconducting limiter element 21 is quenched due to a fault current, the normal conductor parallel coil 23 forms other flowing path for a current, that is, a dividing path, and thus most of the current flows through the normal conductor parallel coil 23 not through the superconducting limiter element 21. As the result, the superconducting limiter element 21 is prevented from being overheated in the event of a fault current occurrence. Furthermore, when a divided fault current flows through the normal conductor parallel coil 23, a magnetic field generated from the normal conductor parallel coil 23 is applied to the superconducting limiter element 21 thereby to uniformly quench the superconducting limiter element 21.

The uniform quenching of the superconducting limiter element 21 is more greatly influenced by the superconducting serial coil 22 than the normal conductor parallel coil 23. Herein, the uniform quenching of the superconducting limiter element 21 means that an entire region of the superconducting limiter element 21 is simultaneously changed into normal conductor.

Figure 4A:
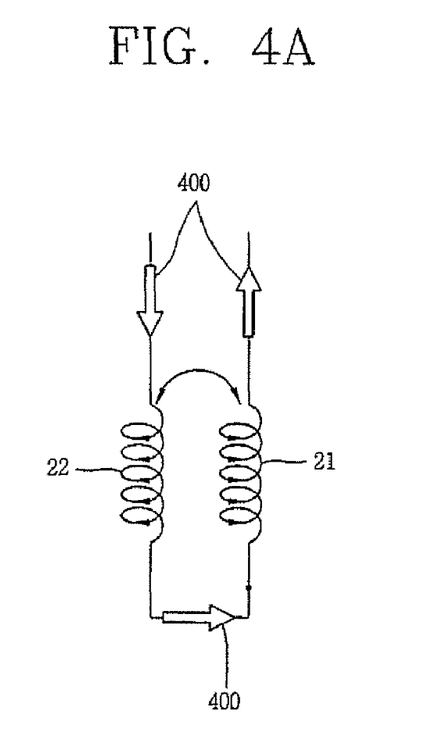
FIG. 4A is an equivalent circuit diagram of the resistive superconducting fault current limiter when a normal current flows according to a first embodiment of the present invention.
Figure 4B:
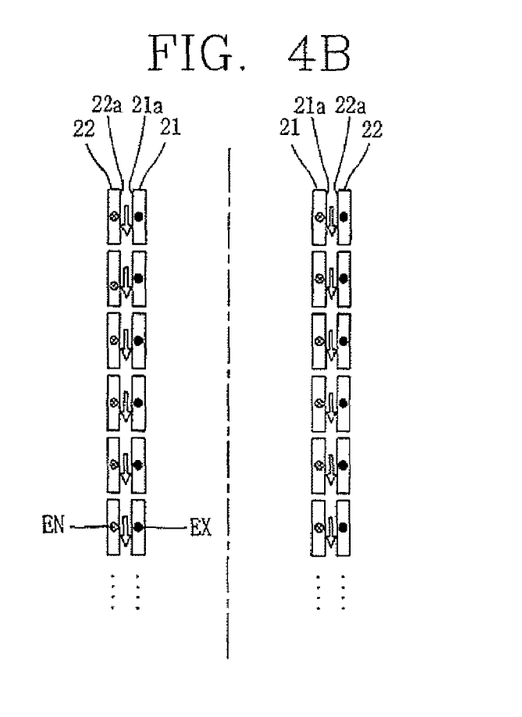
FIG. 4B is a view showing a current and a magnetic field of the resistive superconducting fault current limiter when a normal current flows according to a first embodiment of the present invention.

A construction and an operation of the superconducting fault current limiter according to the present invention will be explained with reference to FIGS. 4A and 4B. FIG. 4A is an equivalent circuit diagram of the resistive superconducting fault current limiter when a normal current flows according to a first embodiment of the present invention, and FIG. 4B is a view showing a current and a magnetic field of the resistive superconducting fault current limiter when a normal current flows according to a first embodiment of the present invention.

When a normal current less than a rated current flows, a current less than a threshold current value flows and thus the superconducting current limiter 21 and the superconducting serial coil 22 have a resistance of '0', respectively. As the result, a current does not flow to the normal conductor parallel coil 23 having a predetermined resistance. An electric circuit of the resistive superconducting fault current limiter according to a first embodiment of the present invention can be expressed as the equivalent circuit diagram of FIG. 4A.

Referring to FIG. 4A, the superconducting limiter element 21 and the superconducting serial coil 22 are serially connected so as to face each other, and have the same winding numbers and the same winding direction, and have opposite current directions (indicated as the arrow). In FIG. 4A, a thick arrow indicated as the numeral 400 denotes a current flowing into/out of the superconducting fault current limiter and a current flowing through the superconducting fault current limiter in a power system.

Since currents flowing through the superconducting limiter element 21 and the superconducting serial coil 22 have opposite directions, magnetic fields formed at each peripheral portion thereof have opposite directions and thus cancel each other.

In FIG. 4A, the arc having arrows at both ends thereof represents that the magnetic fields generated from the superconducting limiter element 21 and the superconducting serial coil 22 are influential on each other.

As shown in FIG. 4B, the superconducting limiter element 21 and the superconducting serial coil 22 are superconducting coils formed as BISCCO-based or YBCO-based superconductors of a tape shape having a thin thickness and wide width surfaces 21a and 22a are wound, and an entire shape of the superconducting limiter element 21 and the superconducting serial coil 22 have a cylindrical shape. The superconducting limiter element 21 is installed at an inner side, and the superconducting serial coil 22 is installed at an outer side so as to surround the superconducting limiter element 21.

The wide width surfaces 21a and 22a of the superconducting limiter element 21 and the superconducting serial coil 22 face each other so that the magnetic fields can be influential on each other.

As shown in FIG. 4B, when a normal current less than a rated current flows on the power system, a current flowing through the superconducting serial coil 22 and a current flowing to the superconducting limiter element 21 are opposite to each other as an entrance direction (EN) and an exit direction (EX).

Therefore, a magnetic field inside the superconducting limiter element 21 and a magnetic field inside the superconducting serial coil 22 have opposite directions thus to cancel each other, thereby remaining only a minute magnetic field between the superconducting limiter element 21 and the superconducting serial coil 22. Accordingly, the superconducting fault current limiter according to the present invention can reduce a current loss by more than three times when compared with a superconducting fault current limiter having only a superconducting limiter element.

The construction of the present invention will be explained in more detail. For example, when a normal current of 300 amperes flows on the power system, a Bi2212 tube or a bulk device is wound 20 times with a helical coil shape as the superconducting limiter element 21 thereby to have a threshold value of 420 A (ampere). A low-temperature insulating material having an excellent conductivity and insulating characteristic is coated outside the superconducting limiter element with a thickness less than 1 mm. The normal conductor parallel coil 23 is wound on the low-temperature insulating material by using a copper coil of 0.16 mm diameter with the number of windings corresponding to approximately 150, and is connected to the superconducting limiter element in parallel. An insulating tube such as a fiber glass reinforced plastic (FRP) is positioned outside the normal conductor parallel coil 23, and the superconducting serial coil 22 is wound on the insulating tube. Herein, the superconducting serial coil 22 formed as two YBCO-coated conductors each having a threshold current of 300 A are laminated to each other as a double-layered structure is wound 20 times in the same direction as the superconducting limiter element 21, thereby being serially connected to the superconducting limiter element.

Figure 5A:
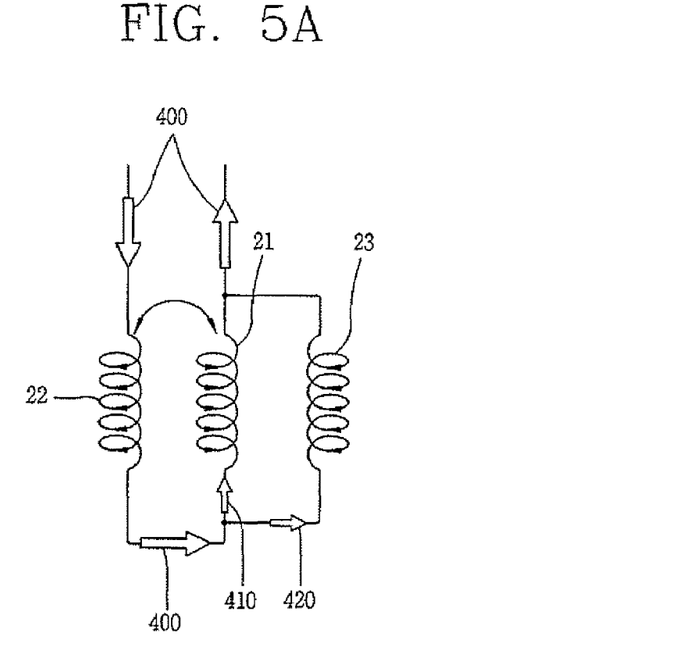
FIG. 5A is an equivalent circuit diagram of the resistive superconducting fault current limiter when a fault current flows according to a first embodiment of the present invention.
Figure 5B:
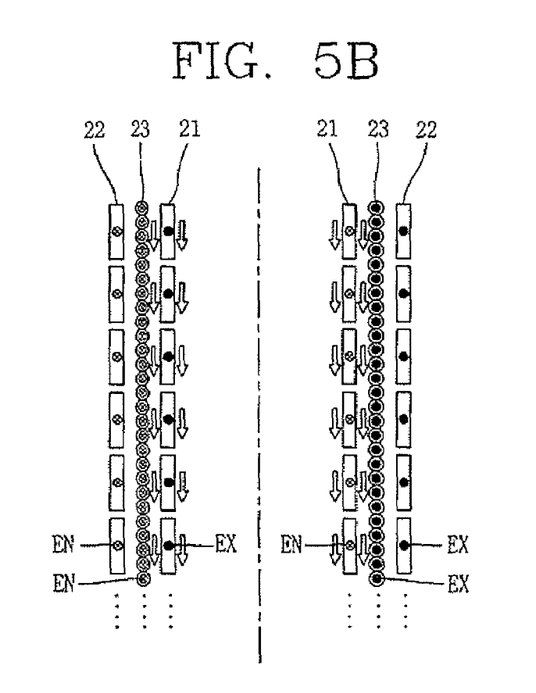
FIG. 5B is a view showing a current and a magnetic field of the resistive superconducting fault current limiter when a fault current flows according to a first embodiment of the present invention.

A construction and an operation of the superconducting fault current limiter according to the present invention will be explained with reference to FIGS. 5A and 5B. FIG. 5A is an equivalent circuit diagram of the resistive superconducting fault current limiter when a fault current flows according to a first embodiment of the present invention, and FIG. 5B is a view showing a current and a magnetic field of the resistive superconducting fault current limiter when a fault current flows according to a first embodiment of the present invention.

Referring to FIG. 5A, under a state that a fault current more than several times or several tens times of a rated current flows to the resistive superconducting fault current limiter as indicated as the downward large arrow 400, when the fault current is more than a predetermined threshold current value of the superconducting limiter element 21, the superconducting limiter element 21 is quenched thus to be changed into a normal conductive state having a resistance of several tens of milli ohms (mΩ)~several ohms (Ω) from a superconductive state having a resistance of '0'(zero).

As the result, the fault current flowing to the superconducting fault current limiter division-flows to the superconducting limiter element 21 and the normal conductor parallel coil 23. Herein, since the normal conductor parallel coil has a resistance smaller than that of 23 the quenched superconducting limiter element 21, most of the fault current flows through the normal conductor parallel coil 23. The reference numerals 410 and 420 indicated as the small arrows of FIG. 5A designate the fault currents division-flowing to the superconducting limiter element 21 and the normal conductor parallel coil 23.

As shown in FIG. 5A, in the even of a fault current occurrence, a current flowing through the normal conductor parallel coil 23 has the same direction as a current flowing through the superconducting serial coil 22, and thus magnetic fields having the same direction are generated therefrom.

In FIG. 5A, the arc having arrows at both ends thereof represents that the magnetic fields generated from the superconducting limiter element 21 and the superconducting serial coil 22 are influential on each other.

Herein, since a current flowing to the superconducting serial coil 22 is much greater than a current flowing to the superconducting limiter element 21 after the quench of the superconducting limiter element 21, magnetic fields are generated as shown in FIG. 5B.

That is, since the current flowing to the superconducting serial coil 22 is much greater than the current flowing to the superconducting limiter element 21, the magnetic field inside the superconducting limiter element 21 is not offset but is formed in a perpendicular direction inside and outside the superconducting limiter element 21 by the superconducting serial coil 22 as indicated as the downward arrow of FIG. 5B. Furthermore, since a current flowing to the normal conductor parallel coil 23 has the same direction as a current flowing to the superconducting serial coil 22, a magnetic field generated from the normal conductor parallel coil 23 has the same direction as the perpendicular magnetic field generated from the superconducting serial coil 22 even if it is smaller than the perpendicular magnetic field. As the result, in the even of a fault current occurrence, a magnetic field is simultaneously generated inside and outside the superconducting limiter element 21 thereby to uniformly quench the superconducting limiter element 21. Therefore, a tolerance of the superconducting limiter element 21 against a high voltage is increased, thereby stabilizing the power system.

The superconducting serial coil 22 can be quenched by a current more than a threshold current value. However, since the superconducting serial coil 22 has a threshold current larger than that of the superconducting limiter element 21 and has a low predetermined resistance to be applied thereto at the time of being quenched, it scarcely has a current limiting function.

Figure 6A:
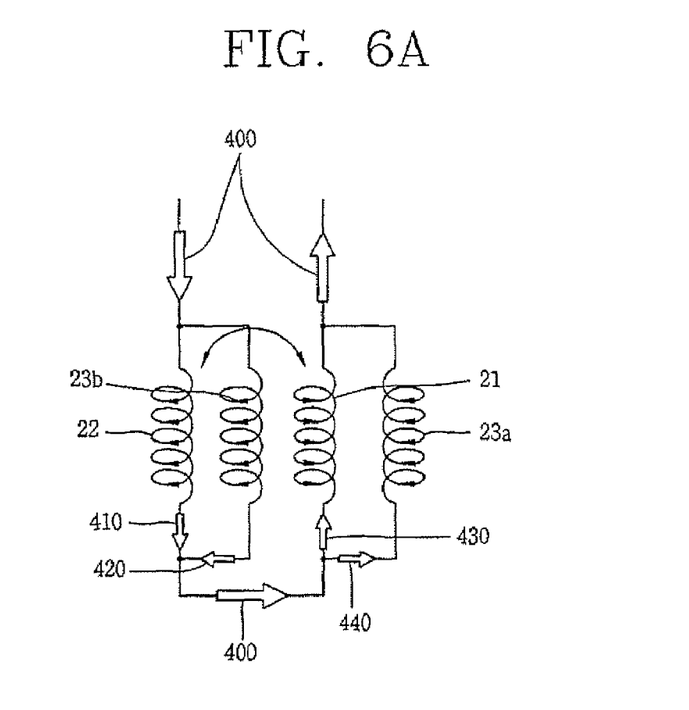
FIG. 6A is an equivalent circuit diagram of a resistive superconducting fault current limiter when a fault current flows according to a second embodiment of the present invention.
Figure 6B:
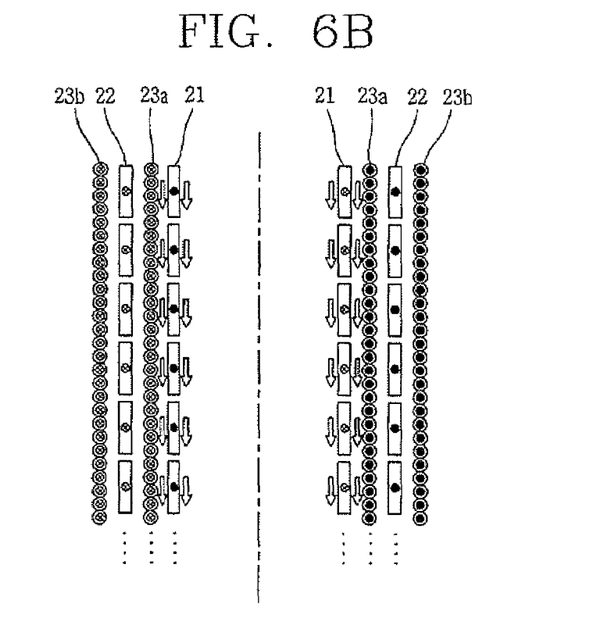
FIG. 6B is a view showing a current and a magnetic field of the resistive superconducting fault current limiter when a fault current flows according to a second embodiment of the present invention.

A construction and an operation of the superconducting fault current limiter according to a second embodiment of the present invention will be explained with reference to FIGS. 6A and 6B. FIG. 6A is an equivalent circuit diagram of the resistive superconducting fault current limiter when a fault current flows according to a second embodiment of the present invention, and FIG. 6B is a view showing a current and a magnetic field of the resistive superconducting fault current limiter when a fault current flows according to a second embodiment of the present invention.

As shown in FIG. 6A, the resistive superconducting fault current limiter according to a second embodiment of the present invention comprises a superconducting limiter element 21 which is in a superconductive state in the event of a normal current flow and changed into a normal conductive state having a predetermined resistance when a fault current having a predetermined threshold current value flows; a superconducting serial coil 22 serially connected to the superconducting limiter element 21; a first normal conductor parallel coil 23a connected to the superconducting limiter element 21 in parallel; and a second normal conductor parallel coil 23b connected to the superconducting serial coil 22 in parallel.

The superconducting limiter element 21 is a superconductor having a helical coil shape.

The superconducting serial coil 22 is serially connected to the superconducting limiter element 21 so as to face each other so that a current loss can be minimized accordingly as currents through them flow in opposite directions thus to cancel magnetic fields from each other. Also, the superconducting serial coil 22 has an 'n' value larger than an 'n' value of the superconducting limiter element 21 by a predetermined ratio so as to be previously quenched than the superconducting limiter element 21 when a fault current occurs. Herein, the 'n' value indicates a transition exponent representing a transition rapidity from a superconductor to a normal conductor. The larger the 'n' value is under the same threshold current value, the faster a transition from the superconductor to the normal conductor is performed.

Preferably, the 'n' value of the superconducting serial coil 22 is larger than is the 'n' value of the superconducting limiter element 21 by 1.5~4.0 times.

The superconducting serial coil 22 serially connected to face the superconducting limiter element 21 is a superconductor having a helical coil shape so as to minimize a current loss by offseting magnetic fields from each other in the event of a normal current occurrence. Also, the superconducting serial coil 22 is arranged to surround the superconducting limiter element 21, and has the same number of windings as the superconducting limiter element 21.

Preferably, the superconducting serial coil 22 and the superconducting limiter element 21 are respectively a superconductor coil formed as a BISCCO-based superconductor of a tape shape having a thin thickness and a wide width surface (for example, Bi2212, Bi2223) or a YBCO-coated superconductor is wound.

The superconducting serial coil 22 and the superconducting limiter element 21 are arranged so that the wide width surfaces thereof can face each other.

Furthermore, the superconducting serial coil 22 and the superconducting limiter element 21 have threshold current values similar to each other by less than a difference of 3%, The first normal conductor parallel coil 23a for preventing the superconducting limiter element from being overheated by dividing a current flowing to the superconducting limiter element and for uniformly quenching the superconducting limiter element by generating a magnetic field when a fault current occurs is connected to the superconducting limiter element 21 in parallel and has a predetermined resistance smaller than the resistance of the superconducting limiter element when a fault current flows.

The second normal conductor parallel coil 23b has a predetermined resistance smaller than a resistance of the superconducting serial coil 22 when a fault current flows.

The second normal conductor parallel coil 23b prevents the superconducting serial coil 22 from being overheated by dividing a current flowing to the superconducting serial coil 22, and uniformly quenches the superconducting limiter element 21 by generating a magnetic field and then applying it to the superconducting limiter element 21 when a fault current flows.

Since the superconducting serial coil 22 is firstly quenched than the superconducting limiter element 21, the uniform quenching of the superconducting limiter element 21 is faster and greatly influenced by a magnetic field generated from the second normal conductor parallel coil 23b than by a magnetic field generated from the first normal conductor parallel coil 23a.

The first normal conductor parallel coil 23a and the second normal conductor parallel coil 23b have the same current direction as one of the superconducting serial coil 22 and the superconducting limiter element 21.

The first normal conductor parallel coil 23a and the second normal conductor parallel coil 23b are solenoid shaped coils, and are positioned outside the superconducting serial coil 22 and between the superconducting limiter element 21 and the superconducting serial coil 22, respectively.

The superconducting serial coil 22 and the superconducting limiter element 21 can be formed of one of a Bi2212 superconducting bulk, a Bi2223 superconducting wire, and a YBCO coated superconductor, respectively.

The first normal conductor parallel coil 23a and the second normal conductor parallel coil 23b are formed of one of copper, bronze, CuNi, and Ni alloy.

The resistive superconducting fault current limiter according to a second embodiment of the present invention can further comprise an insulating layer disposed between the superconducting limiter element 21 and the first normal conductor parallel coil 23a, between the first normal conductor parallel coil 23a and the superconducting serial coil 22, and between the second normal conductor parallel coil 23b and the superconducting serial coil 22. Herein, the insulating layer is formed of an epoxy resin or a fiber glass reinforced plastic (FRP).

An operation of the resistive superconducting fault current limiter according to a second embodiment of the present invention will be explained.

When a normal current less than a rated current flows on the power system, the operation of the resistive superconducting fault current limiter according to the second embodiment of the present invention is the same as the operation of the resistive superconducting fault current limiter according to the first embodiment, That is, since a normal current have less value than each threshold current value of the superconducting limiter element 21 and the superconducting serial coil 22 in the event of a normal current flow, the superconducting limiter element 21 and the superconducting serial coil 22 maintain a superconductive state. As shown in FIG. 6A, since a current does not flow through the first normal conductor parallel coil 23a and the second normal conductor parallel coil 23b, the resistive superconducting fault current limiter according to the second embodiment of the present invention is an equivalent circuit diagram of FIG. 4A. The operation of the superconducting fault current limiter shown in FIG. 4A is the same as the aforementioned one, and thus its detail explanation will be omitted.

Referring to FIG. 6A, when a fault current having a threshold value more than each predetermined threshold current of the superconducting limiter element 21 and the superconducting serial coil 22 is introduced into the resistive superconducting fault current limiter according to the second embodiment as indicated as the downward large arrow 400, the superconducting serial coil 22 having a larger 'n' value is firstly quenched thus to be changed from superconductive state having a resistance of '1'(zero) into a normal conductive state having several tens of milli ohms (mΩ) through several ohms (Ω). As the result, the fault current flowing to the superconducting fault current limiter is division-flows to the superconducting serial coil 22 and the second normal conductor parallel coil 23b. Herein, since the second normal conductor parallel coil 23b has a resistance smaller than that of the quenched superconducting serial coil 22, most of the fault current flows through the second normal conductor parallel coil 23b. The reference numerals 410 and 420 indicated as the small arrows of FIG. 6A denote fault currents division-flowing to the superconducting serial coil 22 and the second normal conductor parallel coil 23b. The division-current flows to the second normal conductor parallel coil 23b connected to the quenched superconducting serial coil in parallel, thereby preventing the quenched superconducting serial coil 22 from being overheated. At the same time, the second normal conductor parallel coil 23b generates a magnetic field by the division-current, and applies the magnetic field to the superconducting limiter element 21 before the superconducting limiter element 21 is quenched, thereby uniformly quenching the superconducting limiter element 21 in the event of a fault current flow. Unexplained reference numerals 430 and 440 denote division-currents flowing to the superconducting limiter element 21 and the first normal conductor parallel coil 23a, respectively.

In FIG. 6A, the arc having arrows at both ends thereof represents that is magnetic fields generated from the superconducting limiter element 21 and the superconducting serial coil 22 are influential on each other.

When the superconducting limiter element 21 is quenched, the division-current flows to the first normal conductor parallel coil 23a thereby to prevent the superconducting limiter element 21 from being overheated.

Since the division-current 440 flows to the first normal conductor parallel coil 23a after the superconducting limiter element 21 is quenched, a magnetic field generated from the first normal conductor parallel coil 23a much less influences on the uniform quenching of the superconducting limiter element 21 than a magnetic field generated from the second normal conductor parallel coil 23b.

When a fault current flows to the superconducting fault current limiter according to the second embodiment of the present invention as shown in FIG. 6A, a magnetic field is generated as shown in FIG. 6B.

That is, since the current flowing through the second normal conductor parallel coil 23b is much greater than the current flowing through the superconducting limiter element 21, the magnetic filed inside the superconducting limiter element 21 is not offset but is formed in a perpendicular direction inside and outside the superconducting limiter element 21 by the second normal conductor parallel coil 23b as indicated as the downward arrow of FIG. 6B.

Furthermore, since a current flowing through the first normal conductor parallel coil 23a has the same direction as a current flowing through the second normal conductor parallel coil 23b, a magnetic field generated from the first normal conductor parallel coil 23a in a downward perpendicular form has the same direction as a magnetic field generated from the second normal conductor parallel coil 23b.

As shown in FIGS. 6A and 6B, since the superconducting limiter element 21 and the superconducting serial coil 22 face to each other and have currents flowing in opposite directions to each other, self magnetic fields generated therefrom cancel each other in the event of a normal current flow. Accordingly, a current loss can be reduced. Furthermore, in the event of a fault current occurrence, the superconducting serial coil 22 is firstly quenched than the superconductig element 21 due to its 'n' value much larger than that of the superconducting limiter element 21, and a magnetic field is applied to the superconductig element 21 faster than a quenched time point of the superconducting limiter element 21 by the division current 420. As the result, the superconducting limiter element 21 can be uniformly quenched.

As aforementioned, the superconducting fault current limiter according to the present invention is interworked with a switch operated by a magnetic force of the normal conductor coil connected to the superconducting limiter element in parallel and an additional circuit breaker for a high voltage or ultra high voltage trip-operated by the switch. Therefore, a circuit of the power system can be completely shielded in the event of a fault current occurrence.

A construction of the superconducting fault current limiter of the present invention connected to a power system of a high voltage will be explained with reference to FIG. 7.

Figure 7:
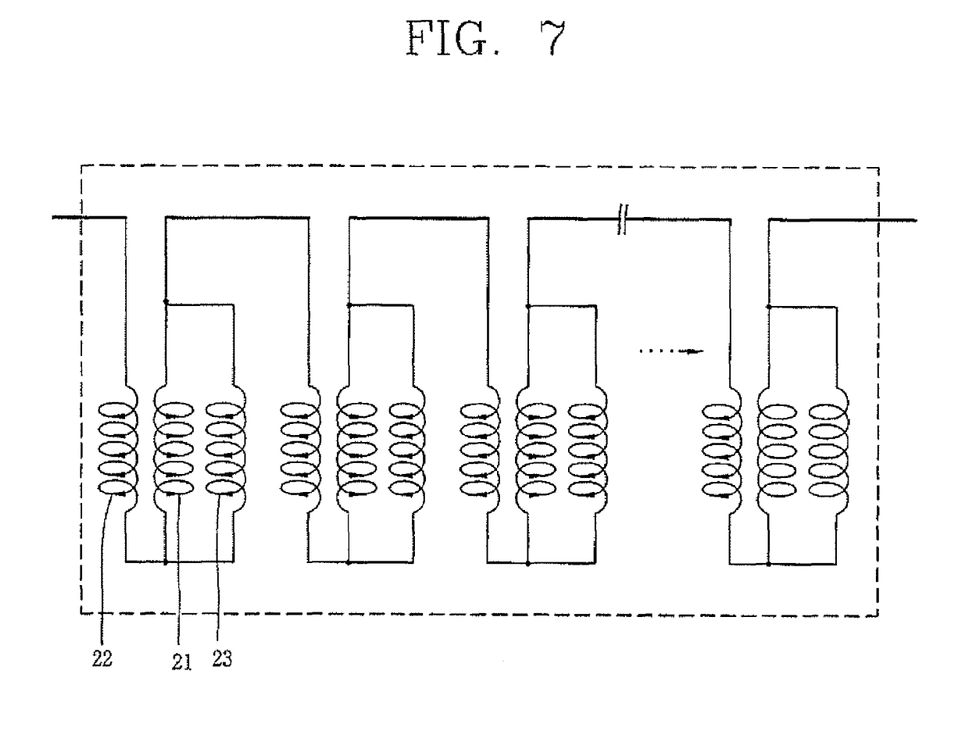
FIG. 7 is an equivalent circuit diagram showing the resistive superconducting fault current limiters serially connected to one another so as to have a tolerance against a high voltage according to a first embodiment of the present invention.

FIG. 7 is an equivalent circuit diagram showing the resistive superconducting fault current limiters serially connected to one another so as to have a tolerance against a high voltage according to a first embodiment of the present invention.

In order to increase a tolerance against a high voltage, a desired number of the resistive superconducting fault current limiters according to the present invention can be connected to one another in serial thereby to constitute a superconducting fault current limiting system.

Herein, the number of the resistive superconducting fault current limiters is determined according to a voltage level of a power system. For instance, if one superconducting fault current limiter has a voltage tolerance of 1 kV, 14 superconducting fault current limiters are serially connected to one another in a power system of a single-phase 14 kV. In the present invention, since a voltage tolerance by one superconducting fault current limiter is increased, the number of necessary superconducting fault current limiters constituting a power system can be reduced. As the result, the entire system can be minimized and the fabrication cost can be reduced.

As aforementioned, in the resistive superconducting fault current limiter according to the present invention, a current loss due to a self magnetic field is greatly reduced, and thus a size and the number of a refrigerator for cooling heat emitted due to the current loss can be reduced.

Furthermore, in the resistive invention, the superconducting limiter element is uniformly quenched in the superconducting fault current limiter according to the present event of a fault current occurrence thereby to increase a tolerance against a high voltage. As the result, the number of the superconducting current limiters constituting a power system of a high voltage is minimized.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims,

What is claimed is:

1. A resistive superconducting fault current limiter, comprising:

a superconducting limiter element which is in a superconductive state when a normal current flows through the superconducting limiter element, and which changes to a normal conductive state in which the superconducting limiter element has a resistance, when a fault current larger than a predetermined threshold current value flows through the superconducting limiter element;

a superconducting serial coil serially connected to the superconducting limiter element, through which a current flows in a direction opposite to the current flowing through the superconducting limiter element, whereby magnetic fields generated by the currents flowing in the superconducting limiter element and the superconducting serial coil cancel each other, the superconducting serial coil having a threshold current value greater than the threshold current value of the superconducting limiter element; and a normal conductor parallel coil connected to the superconducting limiter element in parallel and having a resistance smaller than the resistance of the superconducting limiter element when a fault current occurs, wherein current flowing to the superconducting limiter element is reduced by current flowing through the normal conductor parallel coil, thereby preventing the superconducting limiter element from being overheated, and the normal conductor parallel coil uniformly quenches the superconducting limiter element by generating a magnetic field, when a fault current occurs, and the superconducting limiter element, the superconducting serial coil, and the normal conductor parallel coil are formed as concentric cylinders.

2. The resistive superconducting fault current limiter of claim 1, wherein the superconducting limiter element is a superconductor having a helical coil shape.

3. The resistive superconducting fault current limiter of claim 1, wherein the superconducting serial coil is a superconductor having a helical coil shape, and is installed to surround the superconducting limiter element.

4. The resistive superconducting fault current limiter of claim 1, wherein the superconducting serial coil and the superconducting limiter element are superconducting coils having the same winding direction and the same number of windings.

5. The resistive superconducting fault current limiter of claim 1, wherein the superconducting serial coil and the superconducting limiter element comprise a superconducting coil formed as a BISCCO-based or YBCO-based superconductor of a tape shape having a thin thickness and a wide width surface.

6. The resistive superconducting fault current limiter of claim 1, wherein the superconducting serial coil and the superconducting limiter element are formed of one of a Bi2212 superconducting bulk, a Bi2223 superconducting wire, and a YBCO coated superconductor.

7. The resistive superconducting fault current limiter of claim 1, further comprising an electrical insulating layer disposed between the superconducting limiter element and the normal conductor parallel coil and between the normal conductor parallel coil and the superconducting serial coil.

8. The resistive superconducting fault current limiter of claim 7, wherein the insulating layer is formed of an epoxy resin or a fiber glass reinforced plastic.

9. The resistive superconducting fault current limiter of claim 5, wherein the superconducting serial coil and the superconducting limiter element are arranged such that the wide width surfaces thereof face each other.

10. The resistive superconducting fault current limiter of claim 1, wherein the threshold current of the superconducting serial coil is 1.1~2.0 times the threshold current of the superconducting limiter element.

11. The resistive superconducting fault current limiter of claim 1, wherein a current flowing through the normal conductor parallel coil has the same direction as the current flowing through the superconducting serial coil.

12. The resistive superconducting fault current limiter of claim 1, wherein the normal conductor parallel coil is a solenoid-shaped coil, and is positioned between the superconducting limiter element and the superconducting serial coil or outside the superconducting serial coil.

13. The resistive superconducting fault current limiter of claim 1, wherein the normal conductor parallel coil is formed of one of copper, bronze, CuNi, and Ni alloy.

14. The resistive superconducting fault current limiter of claim 1, wherein a plurality of resistive superconducting current limiters are connected to one another in serial in order to increase a tolerance against a high voltage.

15. A resistive superconducting fault current limiter, comprising:

a superconducting limiter element which is in a superconductive state when a normal current flows through the superconducting limiter element, and which changes to a normal conductive state in which the superconducting limiter element has a resistance, when a fault current larger than a predetermined threshold current value flows through the superconducting limiter element;

a superconducting serial coil serially connected to the superconducting limiter element, through which a current flows in a direction opposite to the current flowing through the superconducting limiter element, whereby magnetic fields generated by the currents flowing in the superconducting limiter element and the superconducting serial coil cancel each other, the superconducting serial coil having a threshold current value greater than the threshold current value of the superconducting limiter element; and a normal conductor parallel coil connected to the superconducting limiter element in parallel and having a resistance smaller than the resistance of the superconducting limiter element when a fault current occurs, wherein current flowing to the superconducting limiter element is reduced by current flowing through the normal conductor parallel coil, thereby preventing the superconducting limiter element from being overheated, and the normal conductor parallel coil uniformly quenches the superconducting limiter element by generating a magnetic field, when a fault current occurs, and the superconducting serial coil increases a tolerance against a high voltage by applying a magnetic field to the superconducting limiter element larger than the magnetic field applied to the superconducting limiter element from the normal conductor parallel coils, thereby uniformly quenching the superconducting limiter element and decreasing the magnetic field generated by the superconducting limiter element, when a fault current occurs.

16. A resistive superconducting fault current limiter, comprising:

a superconducting limiter element which is in a superconductive state when a normal current flows through the superconducting limiter element, and which changes to a normal conductive state in which the superconducting limiter element has a resistance, when a fault current larger than a predetermined threshold current value flows through the superconducting limiter element;

a superconducting serial coil serially connected to the superconducting limiter elements, through which a current flows in a direction opposite to the current flowing through the superconducting limiter element, whereby magnetic fields generated by the currents flowing in the superconducting limiter element and the superconducting serial coil cancel each other, the superconducting serial coil having an 'n' value larger than an 'n' value of the superconducting limiter element so as to quench before the superconducting limiter element quenches when a fault current occurs;

a first normal conductor parallel coil connected to the superconducting limiter element in parallel and having a resistance smaller than the resistance of the superconducting limiter element when a fault current occurs; and a second normal conductor parallel coil connected to the superconducting serial coil in parallel and having a resistance smaller than a resistance of the superconducting serial coil when a fault current occurs, wherein current flowing to the superconducting limiter element is reduced by current flowing through the first normal conductor parallel coil, thereby preventing the superconducting limiter element from being overheated, and the first normal conductor parallel coil uniformly quenches the superconducting limiter element by generating a magnetic field, when a fault current occurs, and current flowing to the superconducting serial coil is reduced by current flowing through the second normal conductor parallel coil, thereby preventing the superconducting serial coil from being overheated, and the second normal conductor parallel coil uniformly quenches the superconducting limiter element by generating a magnetic field, when a fault current occurs.

17. The resistive superconducting fault current limiter of claim 16, wherein the superconducting limiter element is a superconductor having a helical coil shape.

18. The resistive superconducting fault current limiter of claim 16, wherein the superconducting serial coil is a superconductor having a helical coil shape, is arranged to surround the superconducting limiter element, and has the same number of windings as the superconducting limiter element.

19. The resistive superconducting fault current limiter of claim 16, wherein the superconducting serial coil and the superconducting limiter element comprise a superconducting coil formed as a BISCCO-based or YBCO-based superconductor of a tape shape having a thin thickness and a wide width surface.

20. The resistive superconducting fault current limiter of claim 16, wherein the superconducting serial coil and the superconducting limiter element are arranged such that the wide width surfaces thereof face each other.

21. The resistive superconducting fault current limiter of claim 16, wherein the superconducting serial coil and the superconducting limiter element have threshold current values which differ from each other by less than 3%.

22. The resistive superconducting fault current limiter of claim 16, wherein the 'n' value of the superconducting serial coil is larger than the 'n' value of the superconducting limiter element by 1.5~4.0 times.

23. The resistive superconducting fault current limiter of claim 16, wherein the first normal conductor parallel coil and the second normal conductor parallel coil have the same current direction as one of the superconducting serial coil and the superconducting limiter element.

24. The resistive superconducting fault current limiter of claim 16, wherein the first normal conductor parallel coil and the second normal conductor parallel coil are solenoid-shaped coils, and are positioned between the superconducting limiter element and the superconducting serial coil and outside the superconducting limiter element.

25. The resistive superconducting fault current limiter of claim 16, wherein the superconducting serial coil and the superconducting limiter element are formed of one of a Bi2212 superconducting bulk, a Bi2223 superconducting wire, and a YBCO coated superconductor, respectively.

26. The resistive superconducting fault current limiter of claim 16, further comprising an electrical insulating layer disposed between the superconducting limiter element and the first normal conductor parallel coil, between the first normal conductor parallel coil and the superconducting serial coil, and between the second normal conductor parallel coil and the superconducting serial coil.

27. The resistive superconducting fault current limiter of claim 26, wherein the insulating layer is formed of an epoxy resin or a fiber glass reinforced plastic.

28. The resistive superconducting fault current limiter of claim 16, wherein the first normal conductor parallel coil and the second normal conductor parallel coil are formed of one of copper, bronze, CuNi, and Ni alloy.

29. The resistive superconducting fault current limiter of claim 16, wherein a plurality of resistive superconducting current limiters are connected to one another in serial in order to increase a tolerance against a high voltage.

* * * * *